INVENTOR.
MARVIN H. GROVE
KEE W. KIM
ATTORNEYS

INVENTOR.
MARVIN H. GROVE
KEE W. KIM
BY
ATTORNEYS

United States Patent Office 3,481,580
Patented Dec. 2, 1969

3,481,580
GATE VALVE BODY AND SEAT CONSTRUCTION
Marvin H. Grove and Kee W. Kim, Houston, Tex., assignors to M & J Valve Company, Houston, Tex., a corporation of Delaware, and M & J Engineering Company, a partnership consisting of M. H. Grove and J. E. Grove, Houston, Tex.
Filed Dec. 22, 1967, Ser. No. 692,965
Int. Cl. F16k 3/00, 15/18, 5/14
U.S. Cl. 251—328     1 Claim

ABSTRACT OF THE DISCLOSURE

A valve of the fabricated type having end walls with aligned openings forming flow passages. Special machined rings which have a radial wall thickness greater than the hubs are welded within the end wall openings. The exterior extremities of the rings are located a short distance from the exterior faces of the end walls. Pipes or hubs of lesser wall thickness are welded to the exterior ends of the special rings. In manufacture the special rings are first welded within the openings of the end walls, after which the rings and adjacent portions of the end walls are machined to final dimensions. Finally the hubs are welded to the extremities of the rings.

BACKGROUND OF THE INVENTION

In the manufacture of gate valves such as are used in pipe line systems, it is common to fabricate the body by welding together structural members such as steel plates, angles and the like. One simple type of fabricated valve body (see Patent 3,305,213) makes use of relatively heavy flat plates for the end walls of the body, with the side edges of these walls secured to side walls. Hubs are inserted in aligned openings in the end walls and welded in place. The sealing means used for such valves generally consist of annular assemblies which are mounted on the valve body and which make sealing contact with the valve working surfaces of the gate. As disclosed for example in said Patent 3,305,213, a recess is machined into the end plates of the body in the region surrounding the end wall openings, to accommodate and locate the sealing assembly.

One difficulty experienced with the type of construction illustrated in Patent 3,305,213 is that if the hubs are welded in place as one of the last steps of the valve manufacture, the heat of the welding operation causes dimensional changes such that the machined surfaces engaged by the sealing assemblies are no longer accurate. Thus it has been the practice to insert and weld the hubs in place at an early stage of manufacture, and before the machining operations that provide surfaces which contact and fix the location of the sealing assemblies. It will be evident that this materially restricts the flexibility with which such valves may be manufactured to suit the varying requirements of the trade.

SUMMARY OF THE INVENTION AND OBJECTS

This invention relates generally to the construction of gate valves of the fabricated type and to methods for manufacturing the same.

In general it is an object of the invention to overcome the difficulties previously outlined with respect to valves as previously manufactured. More specifically, it is an object of the invention to provide a fabricated gate valve construction to which hubs may be applied by welding in the final phases of manufacture, or under field conditions.

Another object of the invention is to provide a novel method for the manufacture of my valve, the method involving the use of special rings that are welded to the end walls before applying hubs.

Additional objects and features of the invention will appear from the following description in which the preferred embodiments have been set forth in detail in conjunction with the accompanying drawing.

My invention can be summarized as comprising a fabricated box-like valve body consisting of flat metal end walls having their side edges secured to metal side walls. A gate within the body is movable between open and closed operating positions. The end walls have aligned openings for fluid flow, and a special ring is inserted in each opening and secured to the corresponding metal of the end wall by welding. Each ring is relatively short and its exterior extremity is offset from the exterior face of the corresponding end wall. Also it has a radial wall thickness substantially greater than the wall thickness of hubs to be later applied. Thereafter, machining operations are carried out whereby the ring and adjacent portions of the body are machined to final dimensions and surfaces are formed to accommodate and locate annular sealing assemblies for the valve. At some later stage in the process of manufacture, or even after the valve has been completely manufactured, hubs or pipes may be welded to the extremities of the rings, without damaging the sealing assemblies or other parts of the valve, without affecting the weld connections between the rings and the end walls of the body, and without changing critical dimensions.

DESCRIPTION OF THE PREFERRED EMBODIMENTS

Figure 1:
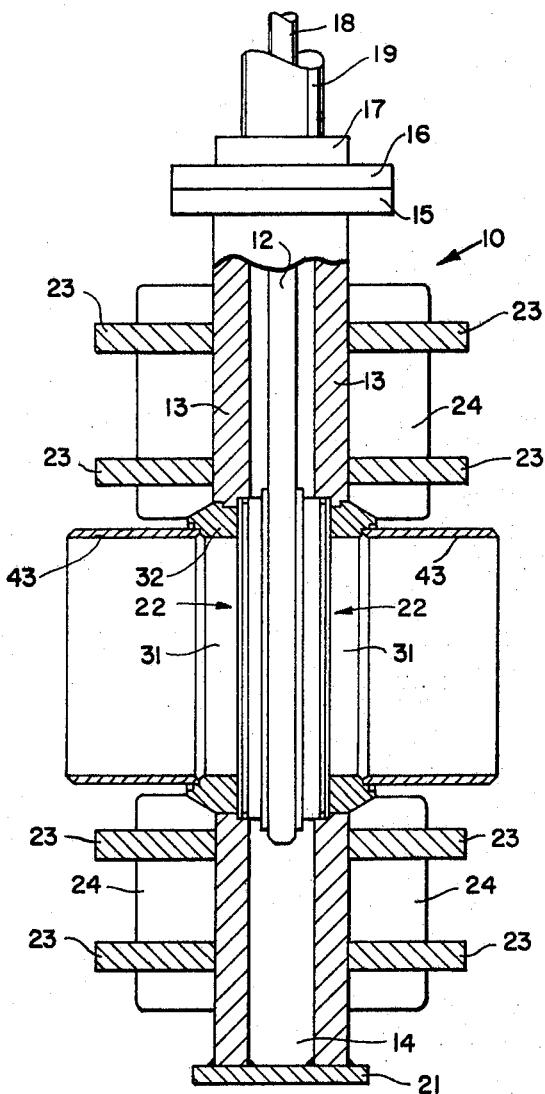
FIGURE 1 is a side elevational view showing a fabricated gate valve incorporating the present invention, the body being partly in section.
Figure 2:
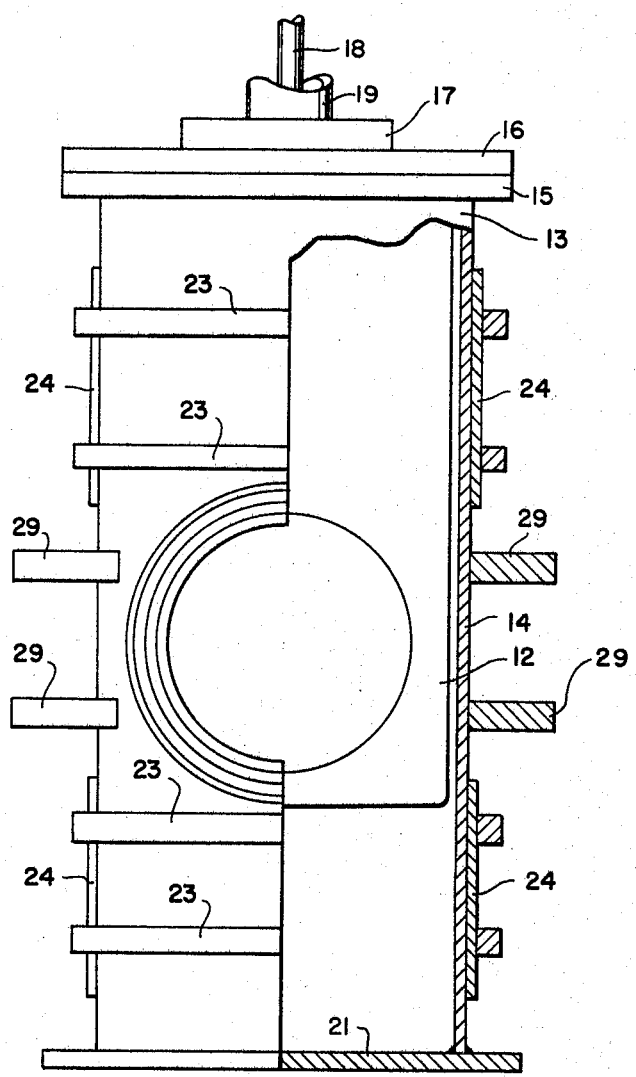
FIGURE 2 is an end view of the valve shown in FIGURE 1, one-half of a portion of the body being in section, and without the hubs shown in FIGURE 1.
Figure 3:
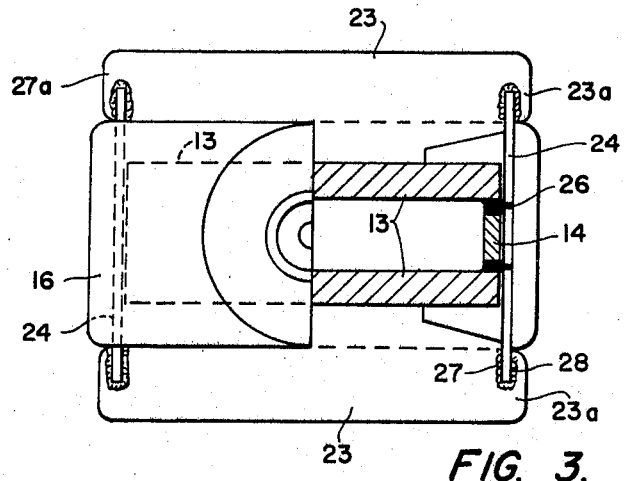
FIGURE 3 is a cross-sectional view taken along the line 3—3 of FIGURE 2.

The valve as illustrated in FIGURES 1–3 consists of a fabricated valve body 10 having an inner gate 12 which is movable by external operating means between open and closed positions. The body is box-like and is made of flat rectangular shaped metal end walls 13 which are relatively heavy and which have their side edges connected by welding to the metal side walls 14. At the top of the body there is a welded-on flange 15 to which the bonnet plate 16 is bolted. A mounting plate 17 is bolted to the plate 16 and serves to carry suitable operating means for movement of the valve stem 18. The pipe or tube 19 may represent the cylinder of a piston-cylinder assembly for power operation, or the yoke of an operator of the handwheel type. The lower end of the body is provided with the welded-on bottom plate 21.

Suitable annular sealing assemblies 22 are shown carried by the end walls 13 for making sealing contact with the surfaces of the gate 12. Various types of sealing assemblies can be used, although I prefer to employ an assembly somewhat as shown in Patent 3,305,213.

Figure 5:
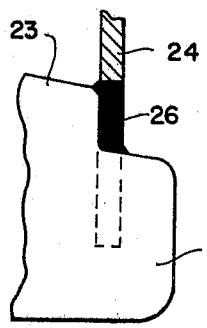
FIGURE 5 is a detail showing welding of the ribs to the side tie plates.

The end walls 13 of the body may or may not be supplied with reinforcing ribs, depending upon the pressures for which the valve is constructed. However, assuming that the value is made for the higher operating pressures, the reinforcing ribbing may be as illustrated in FIGURES 1–3. Thus a plurality of sets or pairs of reinforcing ribs 23 are shown with their edges in abutment with the exterior surfaces of the end walls 13. Both the upper and lower pairs of ribs 23 are secured by welding to side tie plates 24. These plates can be attached to the side surfaces of the body as by the plug welds 26. The end portions 23a of the ribs 23 preferably have a configuration as shown in FIGURE 3, and during assembly of the valve body they are accommodated within slots formed in the plates 24. Weld metal 26 is applied as shown in FIGURE 5 to draw the ribs tightly against the end walls of the body and then penetration welds 27 and 28 are applied. The net effect is to securely attach the end portions 23a of the ribs to the tie plates 24 and to cause stresses to be so distributed as to avoid excessive concentrated stresses.

The end walls of the intermediate portion of the body are shown being reinforced by the C-clamps 29, which are secured in place by welding.

Figure 4:
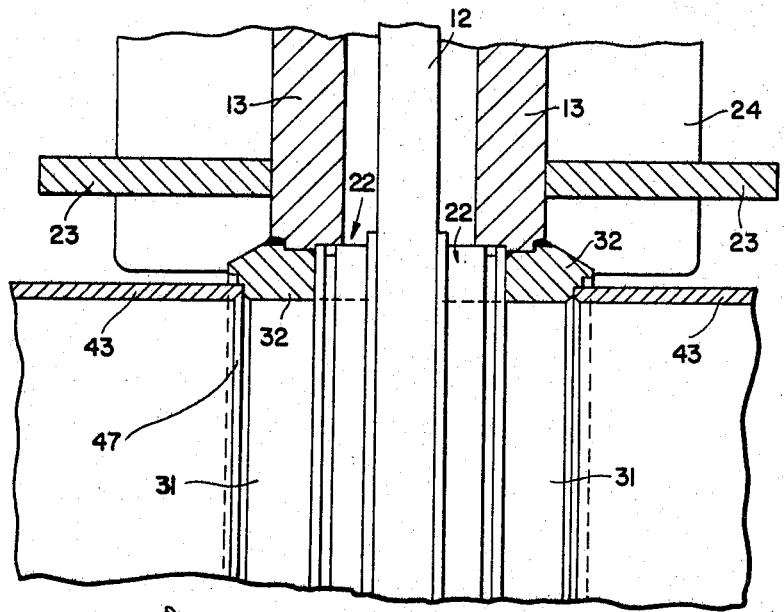
FIGURE 4 is an enlarged detail in section showing the special rings welded into the end walls.
Figure 6:
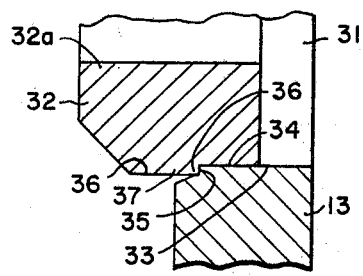
FIGURES 6, 7 and 8 are details in section showing stages in the manufacture.

As shown particularly in FIGURES 1 and 4, the end plates 13 have aligned openings 31 forming flow passages. Welded within each opening there is a special ring 32. Assuming use of mill stock steel plate for the end walls 13, the rings 32 can be made of steel forgings. As initially constructed each ring 32 may have a configuration as indicated at 32a in FIGURE 6. The end wall 13 is first machined preparatory to receiving a ring 32a. Thus in this instance it is machined to provide the cylindrical peripheral surface 33 which is slightly larger in diameter than the machined cylindrical periphery 34 of the ring 32a. Also the end wall 13 is machined to provide the locating shoulder 35 which is engaged by the shoulder 36 on the ring 32a. The wall 13 is also bevelled to provide the V space 37 for receiving weld metal. Other than the machining indicated on the exterior periphery of ring 32a, the remainder of this ring may not be machined, and its dimensions are such as to provide metal to be removed in subsequent machining operations after the ring has been welded to the end wall 13.

Figure 7:
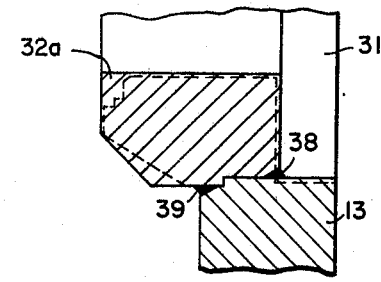

As shown in FIGURE 7, after a ring 32a has been inserted into the end wall 13, weld metal 38 and 39 is applied by internal and external circular welding, with sufficient penetration to firmly secure the ring to the end wall. After rings 32a have been welded in place in the manner shown in FIGURE 7, excess metal is removed by machining to the indicated dotted lines. Note that the removed metal also provides a peripheral surface 41 for accommodating the annular sealing assembly 22 and an annular flat surface 42 on the inner end of ring 32 which serves to seat the assembly 22.

After machining the exterior extremity of each special ring 32 is offset from the exterior surface of the corresponding end wall 13. The amount of the spacing or offsetting may vary in different instances, although it is preferred that it be not less than about one-half and not greater than about three times the thickness of the end walls.

Figure 8:
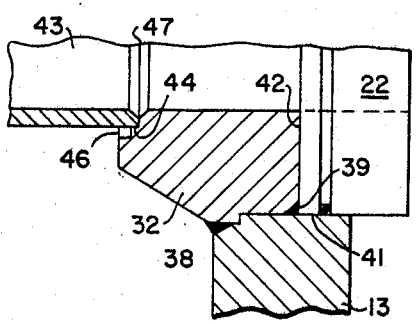

During the course of the machining operations on the special rings and on adjacent portions of the end walls as described above, the exterior portions of the rings are formed to facilitate attachment by welding to piping or hubs 43. As illustrated in FIGURE 8, this machining can provide a recess 44 which accommodates the adjacent end of the hub 43, whereby external and internal circular welds can be applied within the V recesses 46 and 47. Hubs welded on in this manner are shown in FIGURE 1. Note that the radial wall thickness of the special rings 32 is substantially greater than the radial wall thickness of the hubs.

The provision of the special rings 32 welded into the openings of the end walls has been found to be a highly desirable feature for several reasons. It has been found that the circular welding operations required to attach the hubs 43 does not disturb or injure the previously made weld connections between the special rings and end walls. Also it has been found that the welding operations to apply the hubs do not change essential dimensional characteristics, having reference particularly to the dimensional relationship of the surfaces 42 upon which the sealing assemblies 22 are seated. Likewise during such hub welding operations, the heat occasioned does not unduly heat parts of the sealing assembly which may contain plastic or resilient materials such as are permanently deteriorated by temperatures in excess of about 400° F. In addition to the foregoing, the stresses applied to the hubs by bending or twisting are effectively transmitted to the end walls of the body through the relatively heavy rings 32 without undesirable concentration of stresses. Also these rings, because of their relatively heavy construction, serve as reinforcement to stiffen the end walls 13.

It will be evident that with my construction, the fabricated gate values can be made complete at the factory, but without application of the hubs. The hubs can then be applied by welding before the valves are shipped to the customer, or may be applied by the customer in field welding operations.

Figure 9:
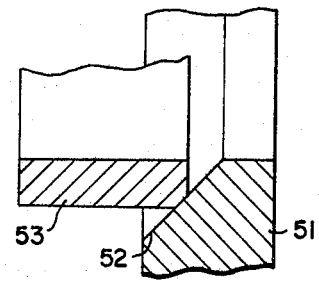
FIGURES 9, 10 and 11 are details in section similar to FIGURES 6–8 but showing another embodiment.
Figure 10:
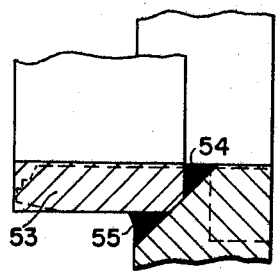
Figure 11:
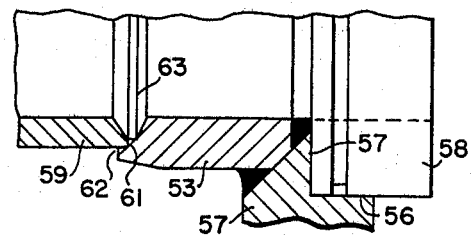

FIGURES 9, 10 and 11 illustrate another embodiment of the special ring. In this instance the initial opening made in the end wall 51 of the body has its edge bevelled as indicated at 52. A forged ring 53 is set against the bevel 52 in the manner shown in FIGURE 9. Internal and external circular welds 54 and 55 are then applied as illustrated in FIGURE 10. Machining operations are now carried out to provide the peripheral and annular surfaces 56 and 57 for accommodating the sealing assembly 58 and to remove metal from the ring 53 to the final dimensions required, as indicated by dotted lines in FIGURE 10. The finished ring 53 appears as shown in FIGURE 11. Its extremity is machined to facilitate the welding on of the hub 59. Thus the machining indicated provides an annular recess to receive the hub 59 and recesses 62 and 63 for receiving weld metal.

We claim:
1. In a gate valve construction, a box-like valve body comprising flat metal end walls having their side edges secured to metal side walls, a gate within the body and movable between open and closed operating positions, the end walls having aligned openings for fluid flow, a metal ring inserted in each opening and secured to the corresponding end wall by welding, the inner end face of each ring being machined and disposed adjacent an annular machined surface that is formed on the surrounding end wall of the body, annular sealing assemblies seated on the inner machined ends of the rings and located by the annular machined surfaces on the end walls of the body, the exterior end of each ring being formed to facilitate a weld connection to an associated pipe or hub having a wall thickness substantially less than that of the ring and an inner diameter equal to that of the ring, each ring being dimensioned in the direction of its axis whereby the plane of its exterior end is spaced from the exterior face of the corresponding end wall by an amount at least equal to about one-half the thickness of the end wall but not more than about three times such thickness, said rings permitting welding of hubs thereto without change in the essential dimensional characteristics of the annular machined surfaces.

References Cited

UNITED STATES PATENTS

| | | | |
|---|---|---|---|
| 1,828,478 | 10/1931 | Sparks | 251—328 X |
| 3,044,741 | 7/1962 | Grove | 251—328 X |

FOREIGN PATENTS

| | | |
|---|---|---|
| 508,384 | 1/1952 | Belgium. |
| 874,691 | 4/1953 | Germany. |

ARNOLD ROSENTHAL, Primary Examiner

U.S. Cl. X.R.

251—329